Oct. 28, 1958 R. J. REYBURN ET AL 2,858,422

FREQUENCY RESPONSIVE SYSTEM HAVING TWO SLOPE-TUNED AMPLIFIERS WITH DIFFERENTIAL CONTROL OF GAIN

Filed April 17, 1953 2 Sheets-Sheet 1

INVENTORS:
Richard J. Reyburn &
Leonard R. Malling
BY Walter J. Jason
ATTORNEY

INVENTORS:
Richard J. Reyburn &
BY Leonard R. Malling
Walter J. Jason
ATTORNEY 2,858,422

FREQUENCY RESPONSIVE SYSTEM HAVING TWO SLOPE-TUNED AMPLIFIERS WITH DIFFERENTIAL CONTROL OF GAIN

Richard J. Reyburn, Pomona, and Leonard R. Malling, Menlo Oaks, Calif., assignors, by mesne assignments, to General Dynamics Corporation, a corporation of Delaware Application April 17, 1953, Serial No. 349,422

4 Claims. (Cl. 250—20)

Figure 1:
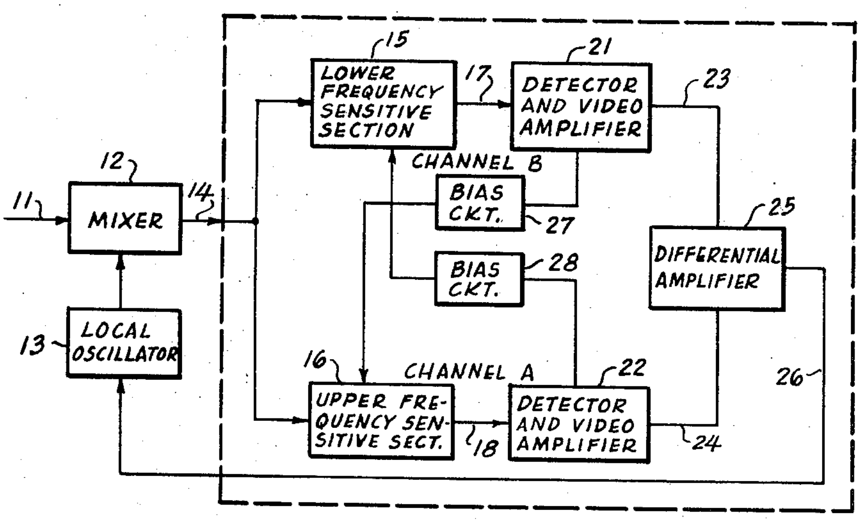

This invention relates to an improved frequency responsive system and more particularly to a frequency responsive system wherein signals are developed which may be utilized for purposes of frequency control or indication.

While the principle of this invention is of general application, it is particularly suitable for frequency stabilization of a source of energy, which application is commonly known in the art as automatic frequency control. Automatic frequency control is most generally utilized in conjunction with super-heterodyne receivers and operates to control the frequency of the local oscillator in a manner to maintain an intermediate frequency constant. Certain requirements should be satisfied by the automatic frequency control system, for example, the frequency band over which control is desired should be adequately maintained, and equally important the control should be sensitive and have a high speed of response. The increased applications of both very high and ultra high frequencies have placed rigid specifications upon a frequency control system since both the transmitter and the local oscillator often have poor frequency stablility. In addition, in echo and radar systems, the transmitted frequency may be pulled at a fairly rapid rate, thereby demanding a fast response in the frequency control system. Where narrow pulse length echo or radar systems are employed, a wide bandwith is also demanded.

Heretofore, automatic frequency control systems have utilized typical discriminator circuits which serve to distinguish between those applied signals which are above or below the control, or intermediate, frequency. The inherent characteristics of these discriminator circuits, however, restrict the band of frequency over which the system is capable of effectively operating. In present systems this fundamental limitation is in part overcome by the addition of searching or sweeping circuits, but only at the expense of substantially reducing the speed of response of the overall system.

It is an object of the present invention, therefore, to provide a new and improved frequency control system in which wide bandwidth operation and high speed of response are attained.

It is another object of this invention to provide a new and improved frequency responsive system with increased sensitivity to frequency deviations.

It is another object of this invention to provide a frequency responsive system in which the sensitivity to frequency deviation may be adjusted independently of the bandwidth.

It is still another object of this invention to provide a new and improved automatic frequency control system with improved pull-in and hold-in characteristics.

It is a further object of this invention to provide a frequency responsive device which has improved stability when subjected to vibration, temperature changes, or supply voltage variations.

It is a further object of this invention to provide a frequency responsive system capable of improved operation with narrow pulse lengths and high pulse repetition rates.

It is a further object of this invention to provide a frequency responsive system in which the possibility of false locks is substantially reduced.

Figure 3:
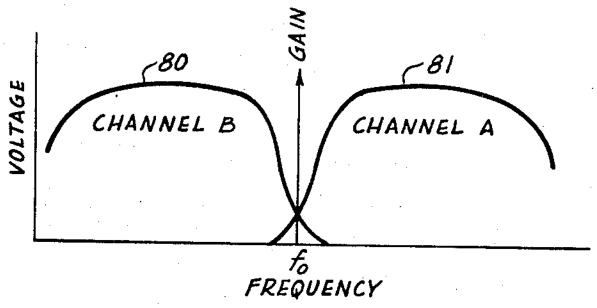
Figure 4:
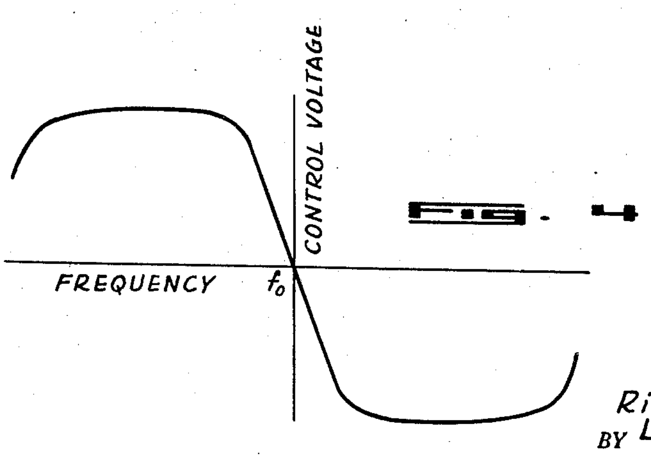
Figure 2:
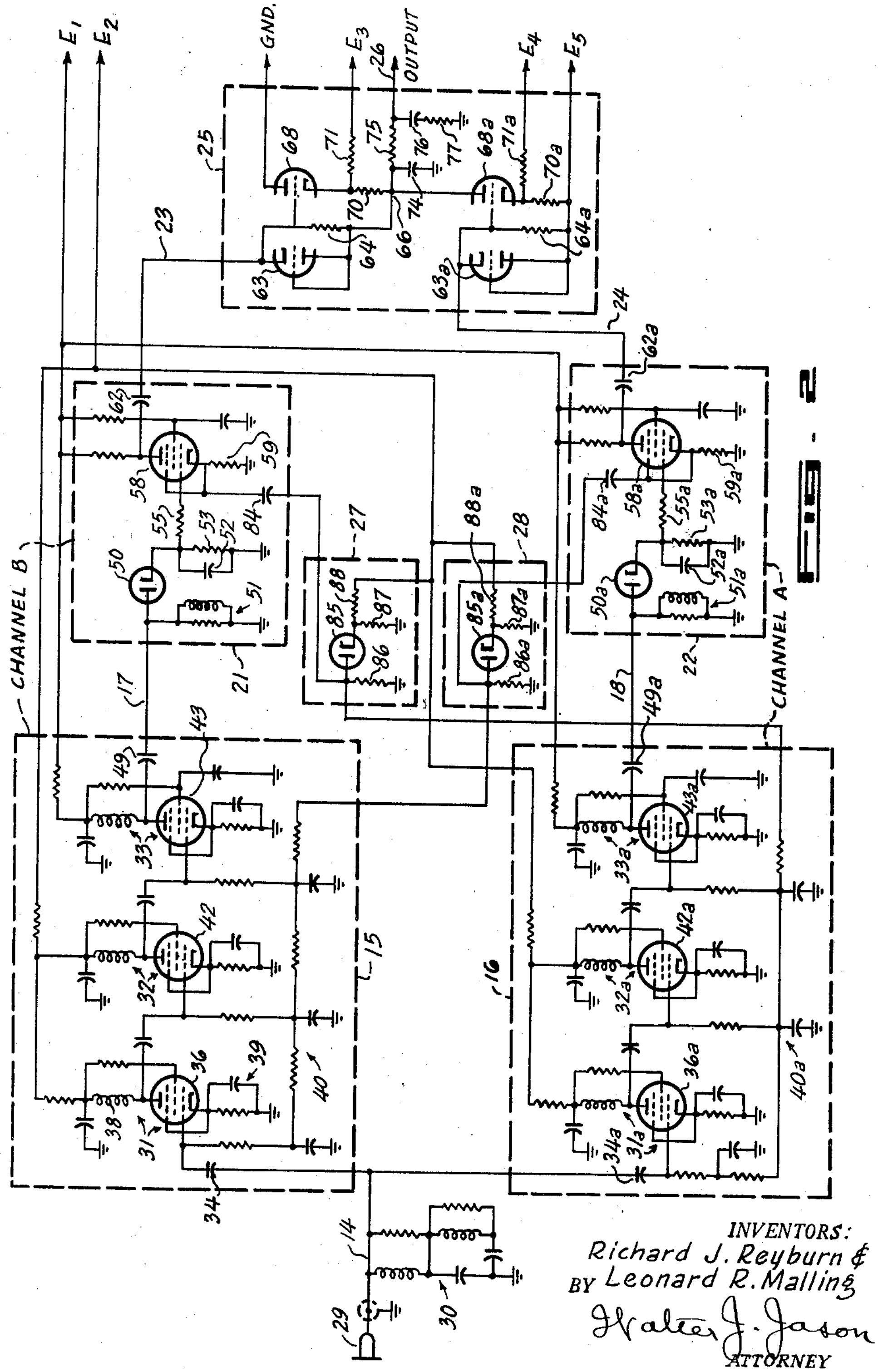

Other objects and features of this invention will be readily apparent to those skilled in the art from the following specification and appended drawings illustrating certain preferred embodiments of this invention in which:

Figure 1 is a block diagram of a frequency responsive system according to the present invention in conjunction with associated circuits illustrating its function as an automatic frequency control device, Figure 2 is a circuit diagram of the frequency responsive system of Figure 1, Figure 3 is a graphical representation of the frequency response characteristics of the upper and lower frequency sensitive sections of the system of Figure 2, and Figure 4 is a graphical representation of the output voltage of the system of Figure 2 as a function of frequency.

By the term "frequency response characteristic" as used herein and in the appended claims, is meant the amplitude of the signal developed by a circuit as a function of frequency when all other variables are held constant.

Referring now to Figure 1 of the drawings, there is represented in block diagram form the automatic frequency control system according to the present invention for maintaining the frequency of an I. F. or intermediate frequency signal at a predetermined value. The radio frequency of R. F. input signal which may be a communication, echo or radar signal, appears on the input conductor 11 of a mixer 12. Mixer 12 may be of an entirely conventional type and serves to combine the signal developed by a local oscillator 13 with the R. F. input signal to thus produce an output beat or I. F. signal appearing on its output conductor 14. This I. F. signal is applied in parallel to a lower frequency sensitive section 15 within a channel B, and an upper frequency sensitive section 16 within a channel A. Sections 15 and 16 function together to cover all expected frequency deviations of the I. F. signal above or below the pre-selected control frequency and further serve to transform any frequency errors into amplitude signals.

The frequency response characteristics of sections 15 and 16 exhibit substantially equal configurations of a relatively broad and flat shape, the difference between them being, however, that the effective center frequency of section 15 is displaced in frequency below the control frequency whereas the effective center frequency of the response characteristic of section 16 is displaced in frequency above the control frequency. The response of both frequency sensitive sections 15 and 16 preferably exhibit equal and highly sloping characteristics approaching the control frequency to thus form a notch at their point of intersection, the intersection, in turn, lying exactly at the control frequency. As the I. F. input frequency deviates from the control frequency, it becomes apparent that the output signals developed by sections 15 and 16 on their output conductors 17 and 18, respectively, will take different magnitudes. These output signals, appearing on conductors 17 and 18, are rectified and then subsequently amplified by detector and video amplifier sections 21 and 22, respectively, also included within channels B and A, respectively, to appear as unidirectional signals on the ouput conductors 23 and 24, respectively, thereof. The relative amplitudes of these unidirectional signals indicate the magnitude of frequency deviation of the I. F. input signal from the control frequency.

The output signals appearing on conductors 23 and 24 are applied to the input terminals, respectively, of a differential amplifier 25 for comparison, and the mangitude of the error signal, appearing on the amplifier output conductor 26, changes in one direction when the signal appearing on conductor 23 is greater than that appearing on conductor 24, and in the opposite direction for the reverse case, and undergoes no change so long as the conductor 23 and 24 signals are equal. This error signal, as hereinbefore stated, may be utilized to indicate the frequency of the I. F. signal or as a feedback voltage to the local oscillator 13, in the manner illustrated, to cause the local oscillator frequency to reduce the frequency deviation of the I. F. signal to substantially zero.

Also included in the system of Figure 1, is a pair of bias circuits 28 and 27, circuit 27 producing a bias signal from detector and video amplifier 21 and applying it to upper frequency sensitive section 16 with circuit 28 producing a bias signal from detector and video amplifier 22 and applying it to lower frequency sensitive section 15. Briefly, circuit 27 acts in response to a deviation of the I. F. frequency below the control frequency to bias upper section 16 such as to substantially reduce the output signal produced by channel A on conductor 24. In the same manner, circuit 28 responds to an increase in the I. F. signal frequency above the control frequency to provide a negative biasing signal to section 15 and thus substantially reduce the output signal produced by channel B on conductor 23. In this way, as will be more fully explained later, the amplification properties of differential amplifier 25 are magnified hence speeding up the response of the entire system and, simultaneously therewith, spurious response to certain ranges and magnitudes of harmonics, which may be present in the incoming I. F. signal, is eliminated.

Reference is now made to Figure 2 where is illustrated in detailed circuit diagrammatic form, the frequency responsive system according to the present invention as before illustrated schematically in Figure 1. Although, as before stated, the present system has application in various electronic fields, for the purposes of this explanation, it is assumed that it is here employed for maintaining a constant I. F. signal frequency in a radar system.

Radar systems generally employ a magnetron pulsed by a modulator at approximately a thousand times per second, each of the pulses serving to trigger the magnetron into oscillations of electromagnetic energy having a frequency of, for example, 10,000 megacycles per second, as determined by the magnetron's natural resonant frequency. These pulsed signals, in turn, are radiated from an antenna and it is the reflections, produced by objects in space, of these pulsed oscillations which enable the radar system to make the desired distance and direction determinations. These reflected signals, still in pulse form, are of the same frequency as the transmitted signals, and are, within the receiving portion of the radar system, immediately mixed with a slightly higher or lower frequency signal, as the case may be, produced by a so-called local oscillator, usually employing a klystron tube, the difference frequency thereof being applied through a conventional I. F. amplifier for eventual use by other sections of the radar system for obtaining the desired information concerning the reflection producing object.

Inasmuch as such I. F. amplifiers are tuned to provide extremely high amplification for only a narrow frequency range of input signals, it is highly desirable that the incoming signal frequency, that is, the frequency difference between the klystron and magnetron signals, be always maintained at the constant I. F. value. Since the magnetron signal frequency is relatively difficult to control, it is generally considered most desirable to continuously regulate the klystron frequency in accordance with the magnetron frequency so as to maintain their frequency difference at the I. F. value. The system of Figure 2 is thus primarily designed to accomplish the above and does so by providing a frequency control signal for the klystron to maintain the frequency difference at the I. F. value.

In particular, a portion of mixer 12 is again illustrated, it including a crystal 29 whose output signal appearing on output conductor 14 is applied across a conventional low pass filter arrangement, generally designated at 30. Not herein specifically illustrated are the two transmission lines required for coupling both the magnetron and klystron output signals to the crystal, the specific structure therefore and manner of coupling being well understood and known in the art.

In operation, crystal 29 serves to combine the two input signals thereto and produces corresponding sum and difference frequencies on conductor 14. Now, filter 30 serves to substantially eliminate all but the first difference frequency and if, for example, the magnetron signal were of a ten thousand megacycle rate and the klystron signal were of a nine thousand nine hundred and forty megacycle rate, then, the principal signal appearing on conductor 14 would be the difference thereof, or sixty megacycles. This output signal would still be in pulse form having a pulse repetition rate of a thousand per second, each pulse thereof comprising actually, a pulse-shaped envelope of the sixty megacycle I. F. signal.

Considering now lower frequency sensitive section 15 of channel B, there is illustrated therein three serially connected amplifier circuits, 31, 32 and 33, all substantially identical in structure. Circuit 31 includes an electronic amplifying device, such as pentode 36, whose grid is coupled through capacitor 34 to output conductor 14 of mixer 12. The anode of pentode 36 is coupled to one end of an inductor 38, the other end of inductor 38 being coupled through a conventional resistance-capacitor isolation circuit to the $E_2$ terminal of a source of potential, not herein specifically illustrated. The cathode of pentode 36 is connected to ground through a conventional paralleled resistor and by-pass capacitor combination 39 while its grid is additionally coupled through a conventional grid-leak resistor to the final stage of a resistor-capacitor filter circuit, generally indicated at 40.

The next amplifier circuit 32 is similar circuitwise to circuit 31, it receiving grid input signals through a conventional coupling capacitor from the anode of pentode 36 with its grid being coupled through an appropriate resistor to the middle stage of filter circuit 40. The final amplifier circuit 33, similar to circuits 31 and 32, has the inductor in the anode circuit of its pentode 43 coupled by way of a resistor-capacitor decoupling circuit to the terminal $E_1$ of a source of potential, not herein illustrated. Also, the grid of pentode 43 is coupled through the usual grid resistor to the first stage of filter circuit 40, the grid also being coupled capacitively to the anode of pentode 42. The output conductor 17, of section 15, previously illustrated in Figure 1, is coupled through a coupling capacitor 49 to the anode of pentode 43.

Upper frequency sensitive section 16 of channel A is identical in structure to section 15 and thus includes three serially connected amplifier sections here designated **31*a*, 32*a* and 33*a*, corresponding to sections 31, 32, and 33, respectively, of section 15. The grid of the pentode 36*a*, within circuit 31*a*, is coupled through a capacitor 34*a* to output conductor 14 while output conductor 18 of this upper frequency sensitive section 16 is coupled through a capacitor 49*a* to the anode of the pentode 43*a* of final amplifier circuit 33*a*. These and all other components and connections within section 16 correspond to similar components and connections within section 15** and are numbered similarly but followed by the subscript "*a*" to be distinguishable therefrom.

The three amplifier circuits comprising the lower frequency sensitive section 15 are stagger-tuned in accordance with the Tchebychef method to present a substantially flat or composite frequency response for approximately thirty megacycles lying in the range of, for example, 30 megacycles through slightly less than 60 megacycles. In the same way, the three amplifier circuits constituting upper frequency sensitive section 16 are stagger-tuned to present a substantially flat or composite frequency response characteristic of approximately thirty megacycles, the range lying between the frequencies of slightly more than 60 to 90 megacycles. In particular, the tuning is accomplished in each of the upper and lower sections by adjusting the anode inductor in each of its corresponding amplifier circuits to resonate with the interelectrode capacitance of its associated pentode, the resonance curve of each amplifier circuit covering approximately a third of the total bandwith required for the section. Now, by adjusting the center resonant frequencies of the three amplifier circuits in each section to include separate thirds of the band and carefully overlapping their adjacent fall off points, it is possible to obtain a substantially flat response characteristic over the designated range.

The frequency response curves of sections 15 and 16 are illustrated graphically in Figure 3 as curves 80 and 81, respectively. The tuning of each of the two sections or channels are so adjusted as to have relatively sharp cut-off characteristics adjacent the 60 megacycles side and are additionally tuned relative to each other that the frequency of their point of overlap, herein designated $f_0$, falls at the desired control or I. F. frequency which is, continuing the example, 60 megacycles. The steeply sloping portions of curves 80 and 81 prior to their intersection at the $f_0$ frequency form a notch, designated 82, to which further reference will be later made.

At this point, it is apparent that if the frequency of the incoming I. F. signal from mixer 12 should deviate from 60 megacycles to a lower frequency, then lower frequency section 15 of channel B will produce an output signal of greater magnitude than formerly owing to the fact that the frequency shift, to the left as viewed from Figure 3, will fall on a more sensitive portion of the channel B response curve 80 representing, in turn, a greater voltage amplification. On the other hand, if the frequency shift should be upward, then the output signal appearing on conductor 18 from the upper frequency sensitive system 16 of channel A would be increased owing to its increased sensitivity at the new frequency as indicated by response curve 81. It is thus seen that, under normal circumstances, upon shift of the input frequency in either direction from $f_0$, the voltage output of one of the sections 15 or 16 will increase in accordance therewith.

As stated before, the output signal from section 15 is derived from the anode of pentode 43 in amplifier circuit 33 through coupling capacitor 49 and appears on output conductor 17. This conductor 17, in turn, is connected within detector and video amplifier 21 to the anode of an electronic rectifier device, such as diode 50, the junction between capacitor 17 and the anode being additionally coupled to ground through a paralleled resistor and inductor combination 51. The cathode of diode 50 is also coupled to ground through a resistor 53 having connected thereacross a capacitor 52. The junction of resistor 53 and the cathode of diode 50 is coupled through a resistor 55 to the grid of an electron flow device, such as pentode 58.

The cathode of pentode 58 is connected to ground through a cathode resistor 59 with the anode of pentode 58 being connected to positive terminal $E_1$ through a conventional plate resistor. The anode of pentode 58 is additionally coupled through a capacitor 62 to output conductor 23 of detector and the video amplifier 21. The circuit diagram of the detector and video amplifier 22 is identical in all respects to that described for detector and video amplifier 21, the corresponding parts thereof being numbered correspondingly but followed, as previously, with the subscript "*a*."

In operation, considering amplifier 21, the signal appearing at the anode of pentode 43 will comprise a series of I. F. frequency modulated pulses having, as stated before, a pulse repetition rate of one thousand per second. Capacitor 49 serves to decouple these pulses from the D. C. anode potential of pentode 43 and diode section 50 serves, owing to its direction of connection, to pass only the positive going portions of each of the pulses. In a usual detector circuit, capacitor 52 would have only such a value such as to maintain a positive charge during the negative going portions of the I. F. signal so as to maintain, across resistor 53, approximately the envelope of the incoming waveform. However, in this case, the capacitance of capacitor 52 is made substantially greater than that usually provided for normal detection and accordingly acts to lengthen or stretch in time, each pulse thus detected by holding a charge after each pulse has ended. Accordingly, each signal pulse appearing across resistor 53 is substantially longer than the pulses in the original envelope appearing on conductor 17. These positive stretched pulses appearing across resistor 53 and capacitor 52 are amplified by pentode 58 and appear as corresponding negative pulses in the output thereof. The anode of pentode 58 is connected through a coupling capacitor 62 to output conductor 23 of detector and video amplifier 21.

In the same way, the I. F. carrier modulated pulses appearing on conductor 18 are detected by the circuit within detector and video amplifier 22 associated with diode section **50*a*, stretched by the corresponding capacitor 52*a* and resistor 53*a* combination, applied through the resistor 55*a* to the grid of pentode 58*a* to be amplified accordingly and appear through capacitor 62*a* on output conductor 24** as stretched pulses of negative amplitude.

Considering now differential amplifier 25, conductor 23 from video amplifier 21 is coupled to the cathode of a tube 63, the grid and anode of which are mutually joined and connected to a junction point 66. The cathode of tube 63 is, in turn, coupled to the grid of the triode section 68, and is additionally coupled to the plate of tube 63 through a grid resistor 64. The anode of triode section 68 is coupled to ground and its cathode is connected to junction 66 through a resistor 70 and is additionally coupled through a resistor 71 to a terminal $E_3$ of a source of potential, not herein illustrated.

Output conductor 24 of video and detector amplifier 22 is coupled to the cathode of a tube **63*a*, corresponding to tube 63, the grid and anode of which are coupled together and from there to the terminal $E_5$ of another source of potential, not here illustrated. The cathode of tube 63*a* is connected to the grid of the triode section 68*a*, corresponding to section 68, and is also connected through a resistor 64*a* to the $E_5$ terminal. The cathode of triode section 68*a* is coupled through a resistor 70*a*, equal in value to resistor 70, to the $E_5$ terminal and is additionally coupled through a resistor 71*a*** to a terminal $E_4$ of another source of potential, not here illustrated. It should be here stated that the potential magnitudes appearing on terminals $E_1$, $E_2$, $E_3$, $E_4$, and $E_5$ may take, by way of example only, the values of +210 volts, +150 volts, +6 volts, −6 volts, and −275 volts, respectively.

The anode of triode **68*a* is connected directly to junction point 66 with junction point 66 being connected to ground through a capacitor 74 and additionally coupled through a filter circuit composed of a series resistor 75 and a series connected shunt resistor 77 and capacitor 76 to output conductor 26 of the differential amplifier. This output conductor 26**, in turn, may be connected to the reflector plate of a klystron tube, with the potential appearing thereon, in turn, controlling the frequency of the output signal thereof.

In considering the operation of differential amplifier 25, assume for example, that a negative pulse is passed through capacitor 62 to the cathode of tube 63. The cathode is accordingly driven negative and the tube draws current thereby decreasing the charge on capacitor 62 and, at the conclusion of the pulse, when the anode of pentode 58 returns to its normally higher level, the cathode of tube 63 and, accordingly, the grid of section 68, will be raised to a more positive potential with the resulting decrease in grid bias and resistance of the triode section 68. The value of resistor 64, it should be here noted, is made large enough in comparison to the capacitance of capacitor 62 that only a small portion of the charge will be passed to junction 66 between pulse occurrences. Also, capacitor 74 will act as an alternating current ground during the pulse period and hence allow section 63 to discharge capacitor 62.

Since the same operation occurs simultaneously for the correspondingly numbered components in amplifier 25 receiving the output signal from detector and video amplifier 22, it is apparent that if the pulses simultaneously appearing on the anodes of pentodes 58 and 58*a* are of equal magnitude, as they will be during periods that the I. F. or control frequency is at its designated value, then, the resistances of triode sections 68 and 68*a* will be decreased the same corresponding amount. Now, since resistors 70 and 70*a* are equal in value, these equal pulse magnitudes will cause no potential change on junction 66.

If, however, the magnetron and klystron frequencies should drift relative to each other to a lower value than the required I. F. control frequency, then, from Figure 3, channel B will produce a greater output signal and the negative pulse applied to triode section 68 will be correspondingly greater than that applied to section 68*a* with the resistance of section 68 decreasing a greater amount. This, in turn, acts to unbalance the voltage dividing network comprising the effective series resistances of triodes 68 and 68*a* and resistors 70 and 70*a*, such that the potential appearing on junction 66 becomes less negative in magnitude. Now owing to the pulse repetition rate, this unbalance resulting in a higher potential, as described for one pulse interval, will be repeated for subsequent pulses with the result that the potential of the filtered output signal appearing on conductor 26 will average out to a higher value. This increased or less negative potential, as coupled to the klystron's reflector electrode, will serve to lower the operating frequency thereof until the point is again reached where the channel A and B output signals are of equal value indicating that the control frequency is again at its desired $f_0$ value.

In the same manner, if the input I. F. signal frequency should drift to a higher value than that desired, then channel A will produce negative pulses of a greater magnitude on its output terminal 24 and corresponding thereto, the resistance of triode section 68*a* will be reduced a greater amount than will triode section 68 with the effect that the potential on junction 66 will become more negative. A series of such pulses, after being filtered, will cause a lower or more negative potential on conductor 26 which, in turn, will raise the klystron's output signal frequency until, once more, the desired incoming signal frequency is obtained.

The discussion thus far of the operation of the system has omitted the operation of bias circuits 27 and 28. Structurally, bias circuit 27 includes a diode 85 whose anode is coupled through a capacitor 84 to the junction between resistor 59 and the cathode of pentode 58 within detector and video amplifier 21. The anode of diode 85 is further connected to ground through a resistor 86 and its cathode is connected to ground through a resistor 87 and to the $E_2$ terminal through a resistor 88. The junction of resistor 86 and the anode of diode 85 is connected to resistance-capacitance or R. C. filter circuit 40*a* in the upper frequency sensitive section 16 of channel A. Bias circuit 28 is structurally similar to circuit 27 and is connected between the junction of resistor 59*a* and the cathode of pentode 58*a* within detector and video amplifier 22 to filter circuit 40 of lower frequency sensitive section 15 of channel B.

In operation, considering first circuit 27, resistors 87 and 88 form a voltage dividing circuit between the terminal $E_2$ potential and ground and are so related in value that a small positive bias is permanently applied to the cathode of diode 85. Accordingly, all positive going pulses above this bias magnitude, as they appear across cathode resistor 59, are shunted to ground through resistor 87, the negative portions of the pulses being blocked by the diode to thus appear across filter circuit 40*a* as a negative potential. This negative voltage acts as a grid biasing signal for pentodes 31*a*, 32*a*, and 33*a* and, at the desired I. F. signal frequency, the negative bias thus applied is of a relatively small magnitude and hence allows channel A to have its normal sensitivity at the notch 82 bottom position.

The circuit parameters and operation of bias circuit 28 are identical to that described above for circuit 27 and the negative signal applied thereby to filter 40 provides a negative bias for the grids of pentodes 36, 42, and 43 within lower frequency sensitive section 15. As was also the case above, when the incoming signal is of the desired $f_0$ frequency, the amount of this negative bias produced by circuit 28 is insufficient to lower appreciably the sensitivity of channel B.

If now, the frequency of the incoming signal should deviate to a value less than $f_0$, then, in the manner previously explained, channel B becomes operative to provide negative output pulses of greater magnitude than formerly to the differential amplifier. Upon such an occurrence, the voltage appearing across resistor 59 increases in value with bias circuit 28 accordingly producing a more negative bias signal which acts, in turn to lower considerably the sensitivity of channel A. Thus, when channel B becomes operative, it simultaneously biases channel A to a substantially inoperative condition.

This cross automatic volume control or AVC feature comprising circuits 27 and 28, adds two important operational characteristics to the system. In the first place the output signal voltage change of amplifier 25 is increased since, upon activation of one channel, the other channel is automatically and simultaneously therewith deactivated and the normal resistance change of the triode section within the differential amplifier corresponding to the deactivated channel will be much less than formerly, the resistance change of the other triode section remaining the same. The result of this type of operation is to effectively magnify the voltage change as it appears on junction 66 and thereby effectively increases the change of voltage on output conductor 26. This action, in turn, decreases the response time of the system and enables any frequency deviation to be rapidly corrected.

The remaining function provided by bias circuits 27 and 28 is to suppress or prevent spurious operation of the system in the event the incoming I. F. signal contains a high harmonic content. For example, without the bias circuits, if the I. F. signal frequency deviates downwardly from the control frequency, then channel B will be energized, and at the same time, if this incoming signal contains harmonics of a magnitude comparable to the fundamental frequency magnitude, then channel A, in whose range such harmonics may lay, will simultaneously therewith be likewise energized and differential amplifier 25 will accordingly not provide as fast or positive response as before described. However, in the system as illustrated, channel A, continuing the example, will be deactivated by the fundamental component in channel B and all harmonics normally appearing therein will not be applied as input signals to amplifier 25. Thus, the present system responds only to the fundamental frequency of the incoming signal and the local oscillator frequency adjusted in accordance therewith.

It is to be particularly noted that the positive bias applied to the cathodes of diodes 85 and 85a is of a permanent nature as derived from the potential appearing on terminal $E_2$. Although, as stated above, the cross AVC system is normally inoperative for input signal frequencies in the immediate neighborhood of $f_0$ in the presence of a relatively large output signal from either of the channels, that channel will automatically act to reduce gain of the other channel having the weaker signal, but, simultaneously therewith, there will be no corresponding action produced by the weak signal channel on the strong channel. Also, the cross AVC feature, as applied in the system of the present invention, has no effect on the normal sensitivity or operation of the system at the $f_0$ frequency and, in this respect, differs considerably from comparable existing systems.

Referring now to Figure 4, there is illustrated a curve showing the relationship between the input or control frequency deviations plotted against the resultant voltage produced on the output conductor of amplifier 25. Thus, at frequencies above the control of $f_0$ frequency, an increasingly more negatively valued output voltage is produced, the waveform thereof approximately corresponding to an inverted version of waveform 81 of Figure 3. On the other hand, below the control $f_0$ frequency, an increasingly less negatively valued signal is produced, its shape corresponding approximately to curve 80 of Figure 3. Also, the slope of this waveform immediately above and below the $f_0$ frequency is slightly steeper than the corresponding portions of curves 80 and 81 owing to the action of the cross AVC circuit as explained previously.

Considering now, the overall operation of the system as compared to present devices utilized for the same purpose, it is apparent that the present system provides several distinct advantages thereover. First of all, since the two channels are structurally similar, having corresponding vacuum tubes, resistor values, condenser values, etc., a virtual immunity to variations in power supply voltages, ambient temperatures, pulse repetition rates, etc., is achieved since such variations will effect equally both sections.

Furthermore, by employing two channels, each having a relatively wide bandwidth of the order of 30 megacycles, it is possible to achieve in a single system an extremely wide and useful bandwidth on the order of 60 megacycles. This bandwidth, as will be appreciated by those skilled in the art, will provide stable and sensitive operation for all frequency variations occurring in normal operation between the magnetron and klystron output signals. This latter is in direct contrast with the type of existing systems having a limited bandwidth on the order of 10 to 15 megacycles. Also, the present system provides a much higher speed of response than the other main type of existing systems employing the well-known sweep function for linearly varying the local oscillator's frequency with time to achieve the needed wide bandwidth on the order of that afforded by the present system.

Still further, the speed of response of the present system is extremely rapid owing both to the sharp cut-off characteristics of the channel A and B response curves, as illustrated in Figure 3 near the desired control frequency $f_0$ point, as well as by the operation of bias circuits 27 and 28 in the manner previously explained. This fast response time, in turn, contributes greatly to the overall operating efficiency of any associated radar system inasmuch as frequency deviations between the magnetron and klystron output signals are rapidly and accurately compensated for, and the I. F. amplifiers in the receiver portion of the radar set are thus able to continuously amplify the incoming I. F. pulsed signals.

Finally, the present system responds quickly and accurately to extremely narrow pulses, a feature lacking in conventional frequency control systems. The system operates satisfactorily for these short pulses principally by reason of the extremely wide frequency response characteristics of its two frequency sensitive sections which, in turn, allows their amplification without undue distortion.

Although the present system has been described and illustrated specifically in connection with a radar system, it is apparent that other uses exist therefor. For example, a voltmeter placed across terminal 26 could well be used to indicate, if scaled properly, the absolute frequency of an incoming signal varying an amount corresponding to the frequency difference between the flat portions of the curve in Figure 4. Also, the present system may be used to stabilize the frequency of any given signal wherein the source producing the given signal is capable of responding to a direct current voltage magnitude for varying its output signal frequency.

As will be apparent to those skilled in the art, the present system is not necessarily limited to the exact components herein set forth for, as will be well known, transistors and diodes may be used for the pentodes, triodes and diodes herein illustrated, as the case may be, and other types of stagger-tuned amplifiers having the desired band pass characteristics may be substituted for the specific circuits herein employed. Also, variations and modifications in the circuitry of the differential amplifiers, detectors, video amplifiers, pulse stretchers etc., may be made without deviating from the spirit and scope of the present invention.

We claim:

1. A frequency responsive system comprising a first frequency sensitive section including a multistage stagger-tuned amplifying circuit having a resultant frequency response characteristic displaced below a control frequency, a second frequency sensitive section including a multi-stage stagger-tuned amplifying circuit having a resultant frequency response characteristic displaced above the control frequency, a first bias circuit responsive to signals produced by said first frequency sensitive section and interconnected with said amplifying circuit associated with said second frequency sensitive section to reduce the gain thereof with increase in amplitude of said signals, a second bias circuit responsive to signals produced by said second frequency sensitive section and interconnected with said amplifying circuit associated with said first frequency sensitive section to reduce the gain thereof with increase in signals in said second section, and output means connected to said frequency sensitive sections for producing an output signal of one polarity when a signal applied to the system is below the control frequency and of opposite polarity when the applied signal is above the control frequency.

2. A frequency responsive system comprising a first frequency responsive section including multistage stagger-tuned amplifier circuits having a resultant frequency response characteristic displaced below a control frequency, and a second frequency sensitive section including multi-stage stagger-tuned amplifier circuits having a resultant frequency response characteristic displaced above said control frequency, a differential output circuit responsive to signals developed by said first and second frequency responsive sections whereby an output signal of one polarity is produced when a signal applied to the system is below the control frequency and of opposite polarity when the applied signal is above the control frequency, and means responsive to an increase in magnitude of signals developed by said first frequency responsive section to lower the amplification of said second section and responsive to an increase in magnitude of signals developed by said second section to lower the amplification of said first section.

3. A frequency control system comprising a variable frequency signal source having a predetermined desired control frequency, a lower frequency sensitive section and a higher frequency sensitive section connected thereto, said lower frequency sensitive section having a broadband substantially flat amplification curve characteristic spaced below said control frequency and having a sharply sloping forward edge intersecting said control frequency at a lesser amplification, said higher frequency sensitive section having a broadband substantially flat amplification curve characteristic speed above said control frequency and having a sharply sloping trailing edge intersecting said control frequency at said lesser amplification whereby signals of said control frequency will pass through said sections at equal amplitude, whereby signals of lower frequency than said control frequency will have greater amplification in said lower frequency sensitive section than in said higher frequency sensitive section and whereby signals of higher frequency than said control frequency will have greater amplification in said higher frequency sensitive section than in said lower frequency sensitive section, volume control means interconnecting said sections in such manner that signals in one of said sections when greater than a predetermined amplitude will lessen the amplification of signals in the other of said sections, differential means connected to said sections and providing an output of amplitude and polarity indicative of which of said sections has the stronger signal and denoting frequency variation of said signal source from said control frequency, and means responsive to said differential means output for changing the frequency of said signal source to said control frequency.

4. A frequency control system as in claim 3, said interconnecting volume control means comprising cross biasing means so connected between said sections that signals above a predetermined amplitude in one of said sections will reduce the gain of the other of said sections.

References Cited in the file of this patent

UNITED STATES PATENTS

| | | |
|---|---|---|
| 2,088,203 | Hansell | July 27, 1937 |
| 2,303,542 | Goddard | Dec. 1, 1942 |
| 2,354,827 | Peterson | Aug. 1, 1944 |
| 2,393,400 | Noviks | Jan. 22, 1946 |
| 2,457,207 | Carlson | Dec. 28, 1948 |
| 2,471,412 | Clark | May 31, 1949 |
| 2,550,510 | Wilcox | Apr. 24, 1951 |
| 2,610,292 | Bond | Sept. 9, 1952 |
| 2,644,035 | Trevor | June 30, 1953 |